I. B. PARKER.
ATTACHMENT FOR MOVING PICTURE MACHINES.
APPLICATION FILED JUNE 12, 1915.

1,173,212.

Patented Feb. 29, 1916.

WITNESS:
C. D. Ellis

INVENTOR
I. B. Parker
BY
John M. Spellman
ATTORNEY

UNITED STATES PATENT OFFICE.

ISAAC B. PARKER, OF DALLAS, TEXAS.

ATTACHMENT FOR MOVING-PICTURE MACHINES.

1,173,212.  Specification of Letters Patent.  Patented Feb. 29, 1916.

Application filed June 12, 1915. Serial No. 33,661.

*To all whom it may concern:*

Be it known that I, ISAAC B. PARKER, a citizen of the United States, residing at Dallas, in the county of Dallas and State of Texas, have invented certain new and useful Improvements in Attachments for Moving-Picture Machines, of which the following is a specification.

My invention has relation to an attachment for moving picture machines and in such connection it relates broadly to means whereby the edges of the film may be lubricated or smoothed prior to the passage of the film through the gate of the machine.

In the operation of moving picture machines, a source of annoyance, loss of films and of time has arisen due to the fact that the perforated edges as well as the body of the film, especially if the film be new, green or improperly cured, swell up, blister and otherwise increase in thickness to an extent that the film will stick during its passage through the gate and in consequence the perforated edges will tear out or tear off thus destroying to a more or less extent the film itself and impairing and impeding the proper manipulation of the machine.

The principal object of my invention is to provide an attachment for a moving picture machine, so constructed and arranged that the face and edges of the film may be properly scraped or lubricated before the film enters the gate to remove the obstructions usually forming on said film prior to the passage of the film through said gate.

In the carrying out of my invention there are provided two fingers, preferably hollow, each of which bears upon a perforated edge of the film under regulated spring tension, and there is also provided a simple means for adjustably connecting the fingers in proper relationship to the frame of the machine and to the film and there is likewise provided a simple means whereby the fingers may be readily and quickly attached to or detached from their supports.

The fingers, when hollow, form oil chambers or reservoirs the bottoms of which are open and filled with a filamentous material to permit the lubricant to ooze through the material and when said material rests upon the film, the fingers form means for lubricating the edges of the film.

The nature and scope of my invention will be more fully understood from the following description taken in connection with the accompanying drawing forming part hereof, in which,—

Figure 4:
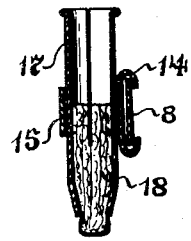
Figure 3:
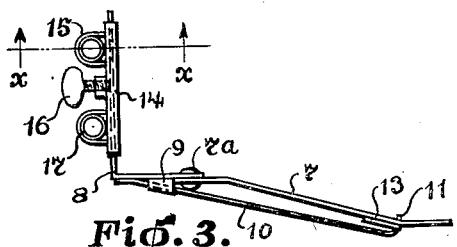
Figure 2:
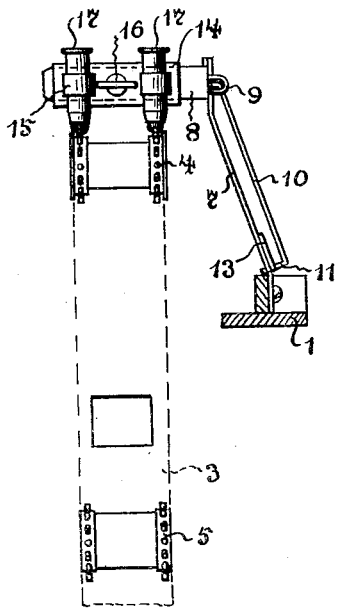
Figure 1:
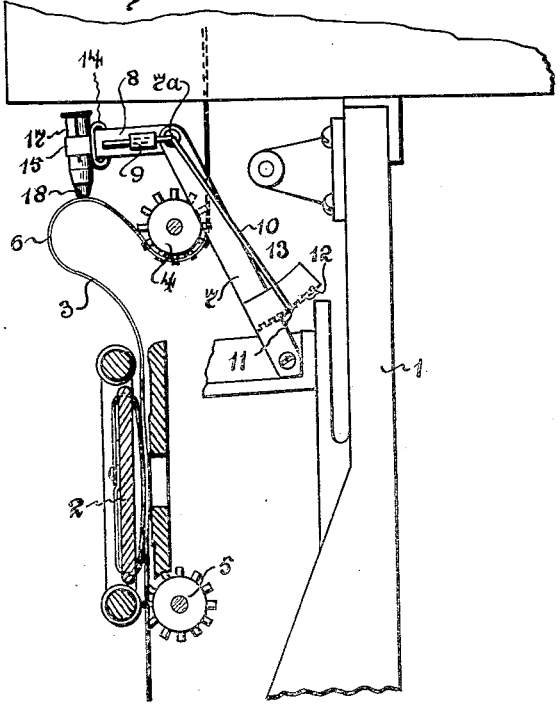

Figure 1, is a side elevational view partly sectioned of certain parts of a moving picture machine and of my present attachment. Fig. 2, is a front elevational view thereof. Fig. 3, is a top or plan view of the attachment removed from the machine, and Fig. 4, is a vertical sectional view enlarged taken on line $x$—$x$ of Fig. 3.

Referring to the drawings, 1 represents the frame, 2 the gate and 3 the film of a moving picture machine. The film 3 has its edges notched or perforated in the usual manner to be engaged by the sprocket 4 above the gate 2 and the sprocket 5 below said gate.

In passing over or through the gate 2 the film 3 bellies out as at 6 above the gate. To the frame 1, adjacent to gate 2 is secured one end of a bracket arm 7 and to the free end of this arm 7 is pivotally connected as at $7^a$, one arm of an angle piece or bracket 8. Both bracket arm 7 and angle piece 8 are preferably formed of thin flat sheet metal. The angle arm 8 is provided at its side with a clip or other fastening 9 into which one end of an angular strip of spring wire 10 is inserted. The other end of wire 10 is bent into a hook 11 arranged to travel over and to engage successive notches 12 of a sector 13 carried by the bracket arm 7. This wire 10 thus forms an adjustable support for the angle piece 8 and when the wire is moved in one direction, say downward, over the notches 12, the angle bracket or piece 8 is elevated, turning on its front $7^a$, while when the wire is moved in an opposite direction, the piece 8 is depressed. In any position of the piece 8 the wire 10 serves as a spring support for the angle bracket 8.

On the free arm of the angle bracket 8 is removably secured a slide 14 of approximately the width of the film 3 and this slide 14 is provided with two tubular projections or clips 15 each arranged at or near an end of the slide 14. A set screw 16 forms a preferred means for locking the slide to the angle bracket 8.

In each of the clips 15 is removably supported a tubular finger or split sleeve 17 of preferably cartridge shape and in the contracted base of each sleeve is packed felt or filamentous material 18, the material 18 projecting somewhat below the contracted base of said sleeve. When in use the cartridge shaped sleeves or fingers 17 project above the film 3 at the point 6 where the same bellies out, and said sleeves 17 with the slide 14 and supporting angle bracket 8 are adjusted so that the protruding felt 18 presses upon the perforated edges of the film 3. In the rapid movement of the film under the fingers 17 the felt scrapes over the body and perforated edges of the film before the film reaches the gate and thus the lumps and sticky projections on said film are rubbed off before the film travels through said gate.
If required each finger 17 may be filled with a lubricant which feeds by gravity through the filamentous material and is deposited upon the perforated edges of the film.
When not in use the attachment as a whole may be removed from the machine by detaching the arm 7 from the frame. Or if desired the slide 14 may be withdrawn from the angle bracket 8, or if required the two fingers 17 may be raised or lowered or wholly removed from the clips 15 of the slide 14.

Having thus described the nature and objects of my invention what I claim as new and desire to secure by Letters Patent, is,—

1. In a moving picture machine provided with a gate and a film having perforated edges, a means under spring tension adapted to bear upon the body and perforated edges of said film to remove obstructions collecting thereon prior to the passage of the film through the gate.

2. In a moving picture machine provided with a gate and a film having perforated edges, two fingers each adapted to rest upon an edge of the film prior to the passage of the film through the gate, and means for supporting said fingers operatively with relation to the film.

3. In a moving picture machine, provided with a gate and a film having perforated edges, two hollow fingers, each having filamentous material protruding from the lower end to rest upon the edge of the film prior to its passage through the gate and means for supporting said fingers in operative position on the film.

4. In a moving picture machine provided with a gate and a film having perforated edges, two fingers adapted to rest under spring tension upon the edges of the film prior to the passage of the film through the gate, and means for adjustably supporting said fingers above said gate.

In testimony whereof I have signed my name to this specification.

ISAAC B. PARKER.